Patented Oct. 24, 1939

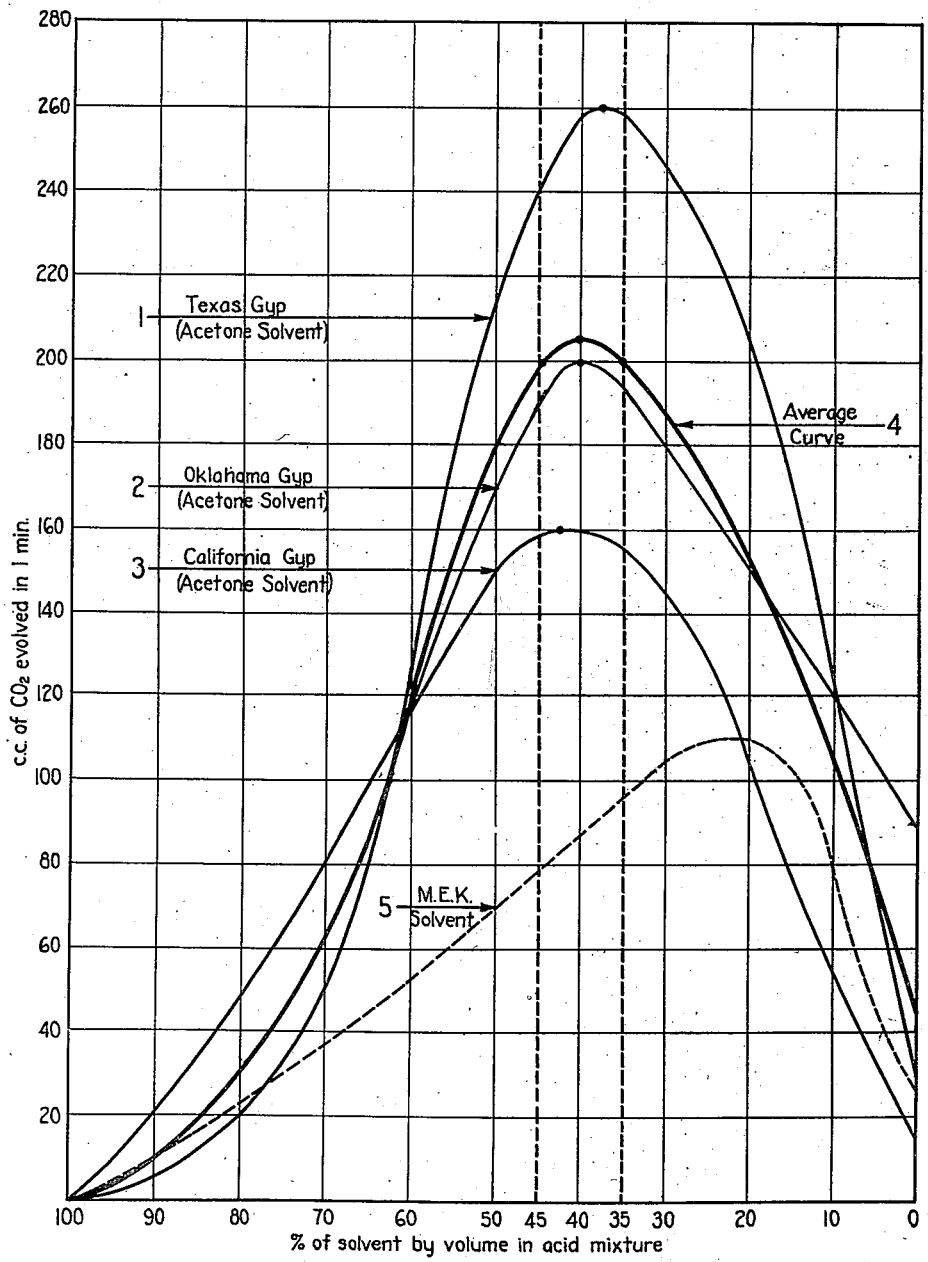

2,177,345

UNITED STATES PATENT OFFICE 2,177,345

METHOD OF TREATING WELLS

Albert G. Loomis and Harold T. Byck, Berkeley, and James F. Fidiam, Jr., San Francisco, Calif., assignors to Shell Development Company, San Francisco, Calif., a corporation of Delaware Application May 11, 1938, Serial No. 207,254

3 Claims. (Cl. 166—21)

This invention pertains to methods for increasing the production of oil and gas wells which fail to respond to usual treatments with hydrochloric acid, and has for its object to provide a method for treating such wells by means of a treating composition consisting of critical amounts of hydrochloric acid and acetone.

This invention will be understood from the following description taken with reference to the attached drawing, wherein the effect of the present treatment on clogging deposits accumulating in wells and adjacent formations is shown by means of curves.

It is well known that a decrease in the production of a well is often due to the accumulation of clogging matter on the walls, casing or tubing of the well and the pores, crevices, capillaries and flow channels of the adjoining formation.

A particularly difficult case for treatment is presented by wells in which the clogging deposits consist of mineral matter such as calcium and magnesium carbonates, silica, etc., mixed and cemented with extractable organic matter such as asphalt, wax and oil, this mixture being known as gyp scale. Gyp deposits usually consist of two distinct layers: a relatively thin outside layer containing carbonates and other salts, but substantially no organic matter, and a thick layer containing organic matter intimately mixed with inorganic components. Gyp deposits are encountered not only in old wells, but also in relatively new wells, their deposition being particularly marked in the zone of greatest pressure drop as the formation fluid flows toward the well.

It has been shown by experience that treatment with hydrochloric acid is ineffective against gyp deposits, since in the darker, thicker layer described above, the carbonate crystals are protected against the action of the acid by the acid-insoluble organic matter.

Similarly, organic solvents such as carbon disulfide or tetrachloride, benzol or gasoline are ineffective against gyp deposits, since the solvent is prevented by the carbonate layer from reaching and dissolving the organic matter.

Although it has been sometime known to treat wells with hydrochloric acid comprising small quantities of surface-tension reducing agents, the increase of production obtained in this manner is very small, and attempts to apply such methods in the field have consistently met with failure. Moreover, after the acid has dissolved the inorganic components of gyp, an acid-insoluble sticky mass is left after the treatment to plug the well and the formation.

It has now been found that gyp deposits can be quickly and effectively disintegrated, dissolved and removed by a treatment with an agent comprising hydrochloric acid and a critical amount of a solvent which has both surface-tension reducing properties and solvent powers with regard to the organic components of gyp.

It has further been found that acetone is by far the most effective solvent which can be used in combination with acid for this purpose, and that most favorable and complete results may be obtained by using acetone in certain critical proportions with hydrochloric acid. Although the use of acetone as a surface-tension reducing agent for hydrochloric acid treatment of wells has already been proposed, for example, by the Chamberlain Patent No. 2,024,718, attempts to apply Chamberlain's method to the treatment of gyp-clogged oil wells have heretofore met with failure in the absence of knowledge as to the critical concentration range of the acid-acetone mixture necessary for this purpose.

Since as stated above, gyp deposits consist of mixed mineral and organic matter, the treating agent is most effective when its acid and acetone components are used in such proportions that the attack on the mineral and on the organic components of the gyp deposits proceeds at substantially the same rate and results in a complete dissolution of each of said components.

Since the composition of gyp deposits or scale varies somewhat in different wells and different parts of the country, the composition of the present treating mixture may also be varied, although only between relatively narrow limits. By applying the present treatment to gyp scale found in numerous widely separated wells in Texas, Oklahoma and California, it has been found that any of the types of scale found therein is highly susceptible to treatment by means of a mixture comprising from 55 to 65% of acid, and from 45 to 35% of acetone, but that outside these limits the effectiveness of the treating mixture decreases at an exceedingly high rate.

In order to illustrate the greater effectiveness of the present treating mixture when used within the above concentration limits, reference is made to the attached drawing which summarizes and averages the results of a great number of treatments applied to gyp scale of different origins.

In measuring the solution rates obtained in these treatments, the method of carbon dioxide evolution was used. Samples of each scale, having equal weights and substantially equal surface areas were treated with hydrochloric acid of 15% concentration combined with varying proportions of acetone, and the volume of carbon dioxide in cubic centimeters evolved in 1 minute was plotted in each case against the per cent of acetone concentration by volume in the treating agent. Curve 1 gives the averaged results of treatments applied to Texas gyp scale, curve 2—of Oklahoma gyp scale, and curve 3—of California gyp scale. It will be seen that the peaks of all three curves, indicating the highest rate of carbon dioxide evolution, and therefore of gyp scale solution, lie within the range of 35–45% acetone concentration.

Curve 4 was drawn to show the average of the results of curves 1, 2 and 3, and represents therefore the average effect of the present treatment on gyp scale of any origin. It will be seen that the relatively flat top portion of curve 4 lies almost entirely within the 35–45% acetone concentration range, indicating that within these limits the present treatment may be applied with substantially the same high effectiveness to any type of scale, while greater or smaller concentrations of acetone will cause the results to fall on the steep portions of curve 4, indicating a rapid decrease of effectiveness away from said range.

It must be noted that the treatment of the same gyp scale samples with hydrochloric acid combined with varying proportions of other solvents, such as various ketones, alcohols, benzol, etc., gave results decidedly inferior to that of acetone. Thus, methyl ethyl ketone, which was found to be the second best solvent after acetone, gave results averaged and shown by curve 5, from which it may be seen that its effectiveness is only approximately 50% that of acetone, and that its most effective concentration range (20–25%) is quite different from that of acetone.

In applying the present treatment to an oil well, the following procedure may be followed:

The well is shut down for about 24 hours, after which the fluid level is determined, and the well pumped off to a desired level. The sucker rods, plunger and standing valve are then pulled out, and the desired amount of the treating mixture, such, for example, as from 500 to 3000 gallons or more, is introduced into the tubing by gravity, the concentration of acetone being from 35 to 40% of the acid mixture. Inhibited acid may be used to prevent corrosion, as the presence of inhibitors does not appreciably decrease the efficiency of the present process. A sufficient amount of water, oil or any other suitable liquid or gaseous medium is introduced or pumped on top of the treating charge to displace the latter from the tubing and to force it, if desired, into the formation. The tubing is then pulled out, and the well is left to stand for a time of from 8 to 24 hours, the fluid level and the fluid acidity being, if desired, periodically checked. The tubing is then re-run into the well, which is put on production in fast motion for a production test.

It is understood that the term "acetone", as used in this specification refers not only to pure or refined acetone, but also to the commercial products known as crude acetone, acetone tops, etc., since the use of these unrefined products was not found to decrease in any appreciable measure the effectiveness of the present process in its application to oil wells.

We claim as our invention:

1. In a method of removing from wells gyp scale comprising mixed mineral and organic deposits, the step of introducing thereinto a treating agent comprising from 55 to 65% of hydrochloric acid and from 45 to 35% of acetone.

2. In a method of removing from wells gyp scale comprising mixed mineral and organic deposits, the step of introducing thereinto a treating agent comprising approximately 60% of hydrochloric acid and 40% of acetone.

3. In a method of removing from wells gyp scale comprising mixed mineral and organic deposits, the step of introducing thereinto a treating agent comprising from 55 to 65% of hydrochloric acid and from 45 to 35% of acetone, applying pressure to force said agent into the formation, allowing said agent to dissolve the clogging deposits, and withdrawing the treating agent and the dissolved deposits from the well.

ALBERT G. LOOMIS.
HAROLD T. BYCK.
JAMES F. FIDIAM, Jr.